(12) United States Patent
Watanabe

(10) Patent No.: US 7,565,840 B2
(45) Date of Patent: Jul. 28, 2009

(54) ACCELERATION SENSOR ELEMENT AND ACCELERATION SENSOR

(75) Inventor: Jun Watanabe, Ina (JP)

(73) Assignee: Epson Toyocom Corporation, Tokyo (JP)

( * ) Notice: Subject to any disclaimer, the term of this patent is extended or adjusted under 35 U.S.C. 154(b) by 303 days.

(21) Appl. No.: 11/636,583

(22) Filed: Dec. 11, 2006

(65) Prior Publication Data

US 2007/0151339 A1    Jul. 5, 2007

(30) Foreign Application Priority Data

Dec. 13, 2005   (JP)   ............................. 2005-358565

(51) Int. Cl.
*G01P 15/097*   (2006.01)
(52) U.S. Cl. .................. 73/514.29; 73/514.34
(58) Field of Classification Search ............. 73/514.29, 73/493, 514.01, 514.36, 514.34
See application file for complete search history.

(56) References Cited

U.S. PATENT DOCUMENTS 4,215,570 A * 8/1980 Eer Nisse ................ 73/862.59
5,165,279 A * 11/1992 Norling et al. ........... 73/514.14
6,145,380 A * 11/2000 MacGugan ................... 73/493
7,140,251 B2 * 11/2006 Kawauchi et al. ........ 73/504.16

FOREIGN PATENT DOCUMENTS

GB          2162314 A  *  1/1986
JP          A 1-259264     10/1989

* cited by examiner

*Primary Examiner*—John E Chapman
(74) *Attorney, Agent, or Firm*—Oliff & Berridge, PLC

(57) ABSTRACT

An objective is to provide an acceleration sensor element that has a high detection sensitivity and that realizes an accurate measurement of acceleration; and an acceleration sensor including this acceleration sensor element to realize a smaller size and a thinner thickness.

An acceleration sensor element comprises a quartz, has a thickness in a Z axis direction, and is formed in a quartz substrate developed in an orthogonal XY plane. A thin-walled section of a bottom section of a concave section of the quartz substrate has a double-ended vibrating reed in which a pair of vibration arms extend in a Y axis direction. When acceleration in a Z axis direction is applied while this double-ended vibrating reed having bending vibration, the acceleration is detected based on a change in a resonance frequency caused when the double-ended vibrating reed deflects in the Z axis direction.

7 Claims, 4 Drawing Sheets

ACCELERATION SENSOR ELEMENT AND ACCELERATION SENSOR

TECHNICAL FIELD

The present invention relates to an acceleration sensor element and an acceleration sensor including this acceleration sensor element. In particular, the present invention relates to an acceleration sensor element for detecting acceleration based on the change in a resonance frequency of a double-ended vibrating reed constituting the acceleration sensor element and the structure of an acceleration sensor.

BACKGROUND ART

Conventionally, an acceleration sensor has been known in which a silicon substrate is subjected to an etching processing to form a both ends support beam structure (simple beam structure) to provide gauge resistance over the surface of a beam section and in which a beam section deflects when acceleration is applied so that this deflection amount is detected based on the change in gauge resistance (see Patent Document 1 for example).

Patent Document 1 Japanese Patent Unexamined Publication No. 1-259264 (page 4, FIG. 1)

DISCLOSURE OF THE INVENTION

Patent Document 1 as described above has a structure in which gauge resistance is provided at a beam section consisting of a silicon substrate. Thus, Patent Document 1 has a problem in that a poor detection sensitivity is caused because a time delay may be caused when the beam section has deflection of at least a few micrometers due to an application of acceleration and a change in the gauge resistance is detected.

Furthermore, the gauge resistance is generally known to have a poor temperature characteristic. Thus, a problem is caused in which a change in a resistance value of the gauge resistance increases in accordance with a temperature change to prevent an accurate acceleration from being measured. As a method for solving this problem, correction of a temperature characteristic can be considered. However, it is assumed that this will cause a complicated control circuit.

It is an objective of the present invention to provide, with a summary of solving the above-described problems, an acceleration sensor element that has a high detection sensitivity and that realizes an accurate acceleration measurement and an acceleration sensor that includes this acceleration sensor element, that has a simple structure, and that realizes a small size and a thin thickness.

The acceleration sensor element of the present invention is characterized in an acceleration sensor element that consists of piezoelectric material, that has a thickness in a Z axis direction, and that is formed at a substrate developed in an orthogonal XY plane, when acceleration in the Z axis direction is applied in the substrate while a double-ended vibrating reed in which a pair of vibration arms extend in a Y axis direction of the substrate having bending vibration, the acceleration is detected based on a change in a resonance frequency caused when the double-ended vibrating reed deflects in the Z axis direction.

Here, an oscillator formed to have a pair of vibration arms and in which both ends of the vibration arms are fixed ends respectively is called as a double-ended vibrating reed. Furthermore, piezoelectric material may be preferably quartz for example.

According to this invention, when acceleration is applied while a double-ended vibrating reed consisting of quartz having bending vibration, the double-ended vibrating reed deflects in the Z axis direction and a change in the resonance frequency of the double-ended vibrating reed is detected. Thus, a highly-sensitive acceleration sensor element can be realized that instantly responses to generated deflection to detect the acceleration.

Furthermore, the double-ended vibrating reed is known to have a high "stress-frequency change" sensitivity and a high frequency stability. By using the double-ended vibrating reed as described above, a change in the resonance frequency when acceleration is applied can be accurately detected as acceleration. In addition, when quartz is used as piezoelectric material, an acceleration sensor element can be provided that has a superior temperature characteristic than that of a structure using the above-described conventional gauge resistance.

Furthermore, it is preferable that the double-ended vibrating reed is formed at a thin-walled section of a bottom section of a concave section provided in the substrate; a cantilever arm structure is formed by a fixed section connected with end sections in a −Y axis direction of the pair of vibration arms and a weight section connected with end sections in a +Y axis direction of the pair of vibration arms, and, when acceleration is applied, the double-ended vibrating reed deflects in the Z axis direction while the fixed section being as a base section.

The double-ended vibrating reed is provided at the bottom section of the concave section of the substrate (i.e., thin-walled section) and thus can have a smaller size. Furthermore, the acceleration sensor element of the present invention has a cantilever arm structure in which a movable section at a tip end has a weight section. Thus, the sensitivity is increased to the acceleration in the Z axis direction and an amount of the displacement in the Z axis direction can be increased. Thus, a wide range detection can be realized from low acceleration to high acceleration.

Furthermore, it is preferable that the double-ended vibrating reed is formed closer to a +Z axis direction side or a −Z axis direction side in a thickness direction.

It is desirable that the double-ended vibrating reed is provided within a range of ½ or more of the thickness of the substrate for example.

The structure as described above allows, when the double-ended vibrating reed is in the +Z axis direction and deflects in the −Z axis direction, the vibration arm to be extended. Thus, the resonance frequency is increased. When the double-ended vibrating reed deflects in the +Z axis direction, the vibration arm contracts and thus the resonance frequency is lowered. Thus, an effect is provided in which the direction and magnitude of applied acceleration can be detected.

Furthermore, it is preferable that the double-ended vibrating reed is formed closer to the fixed section side in the Y axis direction of the substrate.

The structure as described above allows the acceleration sensor element to have no concave section in the +Y axis direction to the center of the Y axis direction (direction having a weight section). Thus, the mass is increased to cause unbalanced mass. Thus, a weight section can be formed without adding another weight member.

Furthermore, it is preferable that both of top and back main surfaces of vibration arms of the double-ended vibrating reed include, in a longitudinal direction, a groove that has a substantially "H" cross section, and the groove is divided at an additional mass section provided at a center in a longitudinal direction of the vibration arms.

Here, the additional mass section denotes a part that does not have the above-described groove. Thus, this part has an increased mass per unit to a part having a groove. Specifically, the center of the vibration arm has a weight section.

It is well-known that a vibration arm including a groove provides a smaller size in the same frequency band. In addition, additional mass section (weight section) can be provided to improve the excitation efficiency of the vibration arm.

Furthermore, it is desirable that an excitation electrode provided at the double-ended vibrating reed is divided to three parts in a longitudinal direction of the vibration arms to provide reverse potentials of neighboring excitation electrodes.

In the double-ended vibrating reed, the center part in the longitudinal direction of a pair of vibration arms is a vibration node. An electrode is divided at this point as a node and reverse potentials are applied to neighboring excitation electrodes so that the direction of displacements of the respective portions of the vibration arm can correspond to the driving force, thus improving the excitation efficiency to provide a higher Q value.

Furthermore, the acceleration sensor of the present invention is characterized in that the acceleration sensor element is stored in a chassis consisting of a case and a covering, and a fixed section of an end section in a −Y axis direction of the acceleration sensor element is fixed to an inner face of the case.

According to this invention, the above-described acceleration sensor element is used. Thus, an acceleration sensor can be provided that has a high detection sensitivity, that can realize an accurate measurement of acceleration, and that has a simple structure to realize a smaller size.

Furthermore, it is preferable that the acceleration sensor element further includes, in the chassis, a control circuit for controlling excitation of the double-ended vibrating reed, and the control circuit is provided in a space of a concave section in which the double-ended vibrating reed is formed.

The control circuit is, for example, an IC having an excitation detection control function.

The double-ended vibrating reed is provided at a thin-walled section of the concave section provided in the substrate. Thus, an IC can be provided in a space including this concave section to provide an acceleration sensor having a thinner thickness.

BRIEF DESCRIPTION OF THE DRAWINGS

FIG. 3(a) exemplarily shows a surface 20a side of a quartz substrate 20. FIG. 3(b) is an explanation view illustrating the connection between the electrode structure showing a B-B section of FIG. 3(a) and an electrode.

FIG. 5(a) is a cross-sectional view illustrating the status when acceleration is applied in a direction +Z. FIG. 5(b) is a cross-sectional view illustrating the status when acceleration is applied in a direction −Z.

BEST MODE FOR CARRYING OUT THE INVENTION

Hereinafter, embodiments of the present invention will be described based on the drawings.

Figure 6:
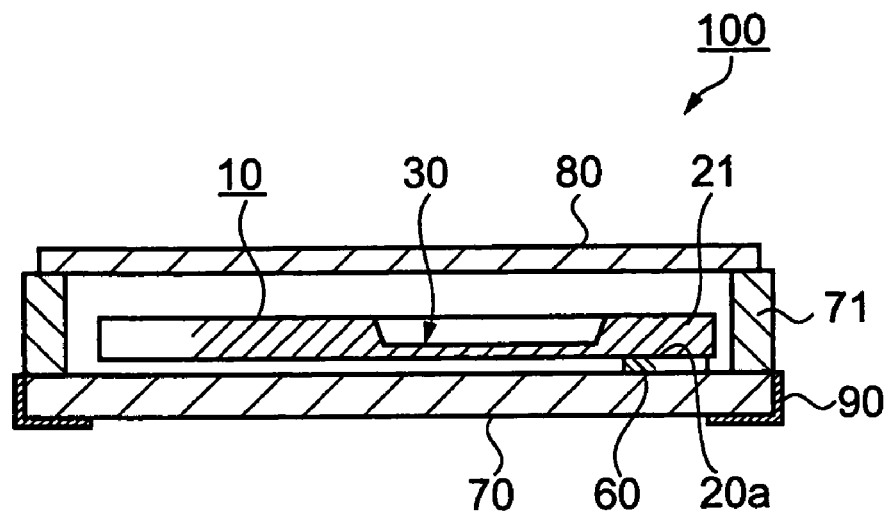
FIG. 6 is a cross-sectional view illustrating the structure of an acceleration sensor including the acceleration sensor element according to Embodiment 1 of the present invention.
Figure 7:
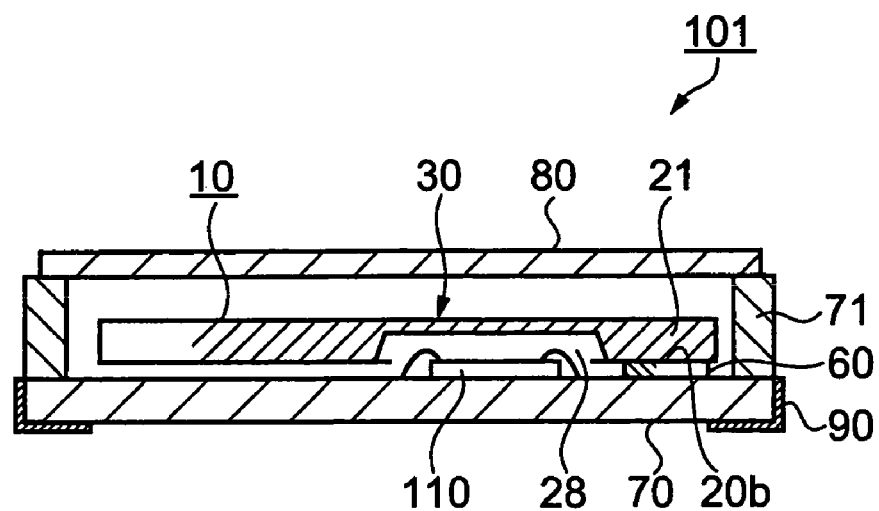
FIG. 7 is a cross-sectional view illustrating the structure of an acceleration sensor according to Embodiment 2 of the present invention.

FIG. 1 to FIG. 5 show an acceleration sensor element according to Embodiment 1 of the present invention. FIG. 6 shows an acceleration sensor using this acceleration sensor element. FIG. 7 shows an acceleration sensor according to Embodiment 2.

Embodiment 1

Figure 1:
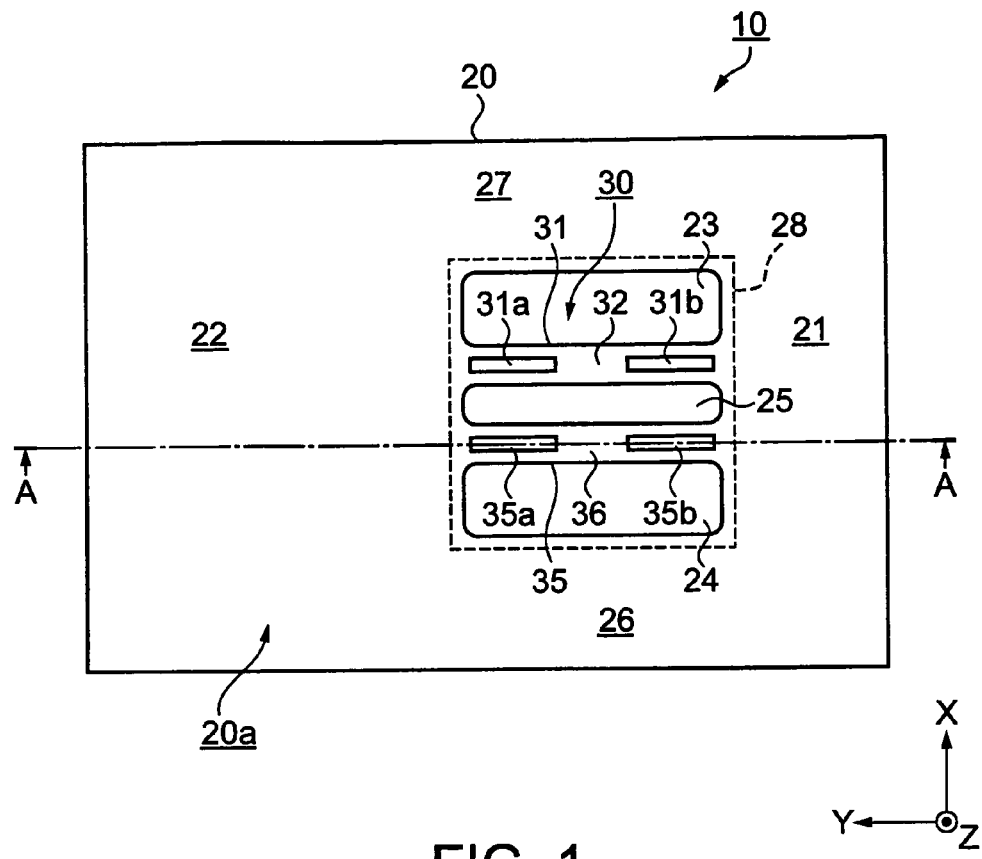
FIG. 1 is a top view illustrating an acceleration sensor element according to Embodiment 1 of the present invention.
Figure 2:
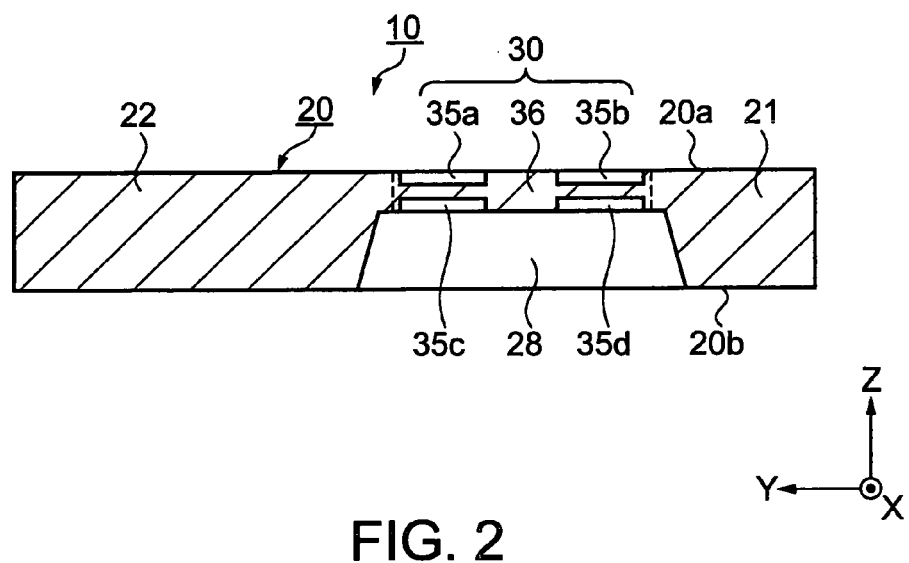
FIG. 2 is a cross-sectional view illustrating an A-A section of FIG. 1.

FIG. 1 is a top view illustrating the acceleration sensor element according to Embodiment 1. FIG. 2 is a cross-sectional view illustrating the section A-A of FIG. 1. In FIG. 1 and FIG. 2, an acceleration sensor element 10 is a substrate Z that has a thickness in a Z axis direction and that is formed in a quartz substrate 20 of piezoelectric material developed in an orthogonal XY plane. This acceleration sensor element 10 has a basic structure in which a −Z axis direction main surface 20b of the quartz substrate 20 (hereinafter may be simply referred to as back face) includes a square concave section 28. This concave section 28 includes a thin-walled section at the bottom section. The thin-walled section has a pair of vibration arms 31 and 35 extending in parallel with the Y axis.

The concave section 28 provided in the quartz substrate 20 is provided closer to the −Y axis direction side of the Y axis of the quartz substrate 20. In this embodiment, the concave section 28 is provided at the −Y side of about ½ of the length in the Y axis direction of the quartz substrate 20 (right side in the drawing). The total thickness part of the further −Y side of this concave section 28 is a fixed section 21 in which connection terminal sections 46 and 56 (see FIG. 3(a)) (which will be described later) are formed. Furthermore, a total thickness part at the +Y side of the concave section 28 is a weight section 22.

A double-ended vibrating reed 30 is manufactured by firstly subjecting the back face 20b of the quartz substrate 20 to a half etching method to form the concave section 28 to subsequently use an etching method to form penetration holes 23, 24, and 25 that are parallel with the Y axis and that have a substantially-rectangular shape, thereby forming the pair of vibration arms 31 and 35 having a thinner thickness than that of the periphery section. The pair of vibration arms 31 and 35 thus formed have, at both ends thereof, a simple beam structure connected to the fixed section 21 and the weight section 22. An oscillator having the form as described above is called as a double-ended vibrating reed.

It is noted that the double-ended vibrating reed 30 is provided closer to the back face 20b from ½ of the thickness of the quartz substrate 20 or is provided closer to the main surface 20a side of in the +Z axis direction (hereinafter may be simply referred to as surface). This embodiment shows an example in which the double-ended vibrating reed 30 is formed within a range of ⅓ of the thickness from the surface 20a side.

Figure 3A:
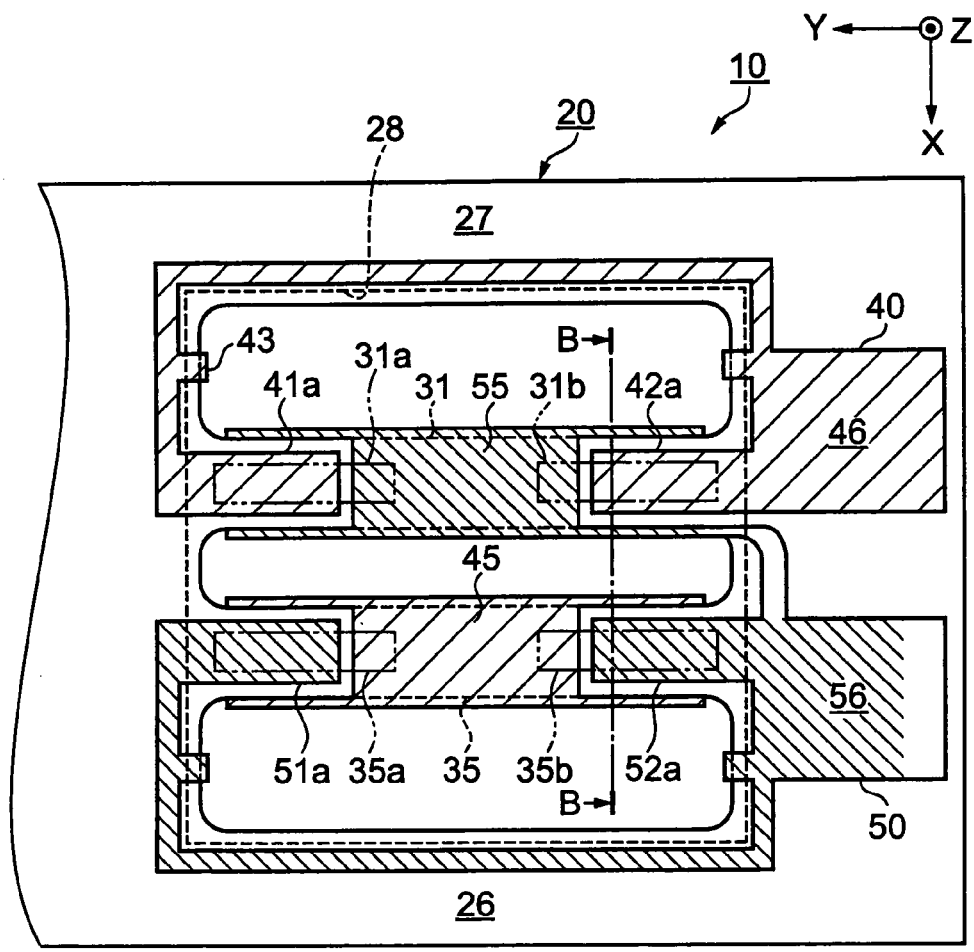
FIGS. 3(a) and 3(b) are an electrode structure diagram illustrating the structure of an excitation electrode according to Embodiment 1 of the present invention.
Figure 3B:
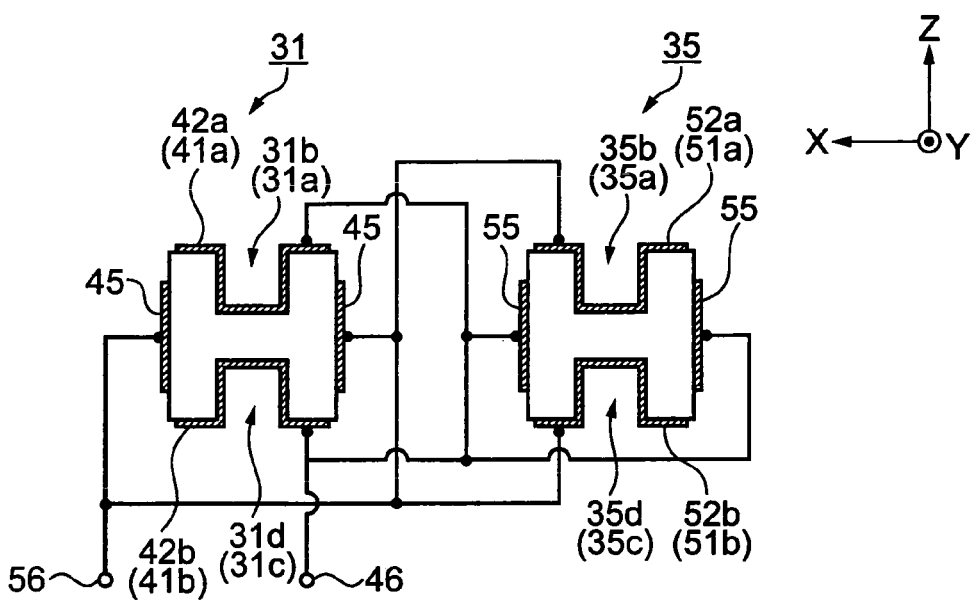

The vibration arms 31 and 35 respectively include grooves 31a to 31d and 35a to 35d provided from both of the top and back faces in the Y axis direction (see also FIG. 3(b)). These grooves 31a, 31c, 35a, and 35c extend from the +Y axis direction to the −Y axis direction. The grooves 31b, 31d, 35b, and 35d extend from the −Y axis direction to the +Y axis direction. Thus, by providing these grooves, the vibration arms 31 and 35 have a cross section in the Z axis direction having a substantially "H"-like shape (see FIG. 3(b)). The vibration arms 31 and 35 have, at the center part in the longitudinal direction, additional mass sections 32 and 36 in which the above-described groove is not formed.

At the surfaces of the vibration arms 31 and 35 formed in the manner as described above, the first excitation electrode 40 and the second excitation electrode 50 are formed (see FIG. 3(a)).

FIGS. 3(a) and 3(b) are an electrode structure diagram illustrating the structure of an excitation electrode according to this embodiment. FIG. 3(a) exemplarily shows the surface 20a side of the quartz substrate 20. FIG. 3(b) is an explanation view illustrating the connection between the electrode structure and the electrode of a B-B section of FIG. 3(a). In FIGS. 3(a) and 3(b), the surface of the vibration arm 31 has thereon an electrode divided to three parts of excitation electrodes 41a, 42a, and 55. The excitation electrodes 41a and 42a are also formed at inner faces of grooves 31a and 31b, are formed over the surface of a link section 27, and are connected to a connection terminal section 46 formed at the surface 20a of the fixed section 21. An excitation electrode 55 extends to both side faces of the vibration arm 31 and one end is connected to a connection terminal section 56 formed at a vibration arm 35.

At the surface of the vibration arm 35, an electrode divided to three parts of excitation electrodes 51a, 52a, and 45 is formed. The excitation electrodes 51a and 52a are also formed at the inner face of the grooves 35a and 35b, are formed over the surface of the link section 26, and are connected to the connection terminal section 56 provided at the surface 20a of the fixed section 21. The excitation electrode 45 extends to both side faces of the vibration arm 35 and one end passes the back face side and is connected to the excitation electrode 41a formed at the vibration arm 31 via the connection pattern 43.

It is noted that the back face of the vibration arm 31 has excitation electrodes 41b and 42b that are opposed to excitation electrodes 41a and 42a and that are plane symmetrical to the surface of the vibration arm 31 (see FIG. 3(b)). The excitation electrode 55 passes the side face and is formed so as to be also plane symmetrical to the back face side.

Also in the vibration arm 35, the back face has excitation electrodes 51b and 52b that are opposed to excitation electrodes 51a and 52a and that are formed so as to be plane symmetrical to the surface of the vibration arm 35. The excitation electrode 45 passes the side face and is formed so as to be also plane symmetrical to the back face side.

A relation between excitation the electrodes 41a and 42a and the excitation electrode 55 will be described. When assuming that the vibration arm 31 has a length "L", the lengths of the excitation electrodes 41a and 42a are divided at the length of 0.225L from end sections of vibration arms, respectively. The respective clearances may have a distance that prevents short circuit. The excitation electrodes 41a and 55 and the excitation electrodes 42a and 55 are set so as to have reverse potentials.

The relation with the excitation electrode 51a, 52a, and 45 at the vibration arm 35 side is also similarly set.

Next, with reference to FIG. 3(b), the structure of the connection among the respective excitation electrodes will be described. The excitation electrodes 42a, 41a, 42b, and 41b formed at the top and back faces of the vibration arm 31 and the excitation electrode 55 formed at the vibration arm 35 are connected to provide the first excitation electrode 40 and are connected to the connection terminal section 46 connected to a control circuit (not shown).

Furthermore, the excitation electrodes 52a, 51a, 52b, and 51b formed at the top and back of the vibration arm 35 and the excitation electrode 45 formed at the vibration arm 31 are connected to provide the second excitation electrode 50 and are connected to the connection terminal section 56 connected to a control circuit (not shown).

The first excitation electrode 40 and the second excitation electrode 50 are applied with an alternating voltage having reverse potentials.

Next, a form of a bending vibration of the double-ended vibrating reed 30 of this embodiment will be described with reference to the drawing.

Figure 4:
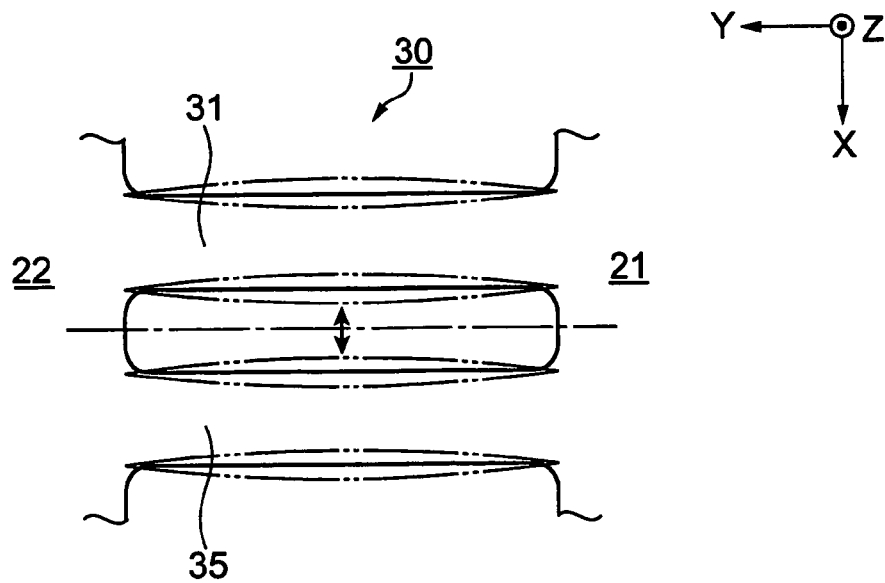
FIG. 4 is an explanation view schematically illustrating a vibration form of a double-ended vibrating reed according to Embodiment 1 of the present invention.

FIG. 4 is an explanation view schematically illustrating the vibration form of the double-ended vibrating reed 30. In FIG. 4, when the first excitation electrode 40 and the second excitation electrode 50 described above are applied with an alternating voltage, the vibration arms 31 and 35 are excited by bending vibration as shown by the arrow in the drawing (in the drawing, forms shown by the dashed line and the dashed-two dotted line). By this, a signal having a predetermined resonance frequency is stably outputted from the connection terminal sections 46 and 56.

Each of the vibration arms 31 and 35 includes the excitation electrode divided to the three parts as described above. Thus, driving forces of vibration arms generated by the respective excitation electrodes correspond to a direction of a displacement when the respective vibration arms have resonance. Thus, not only an excitation efficiency but also a Q value can be improved.

When the acceleration sensor element 10 is applied with acceleration like an impactive force in the Z axis direction during this bending vibration, the acceleration sensor element 10 including the vibration arms 31 and 35 deflects in the Z axis direction.

Figure 5A:
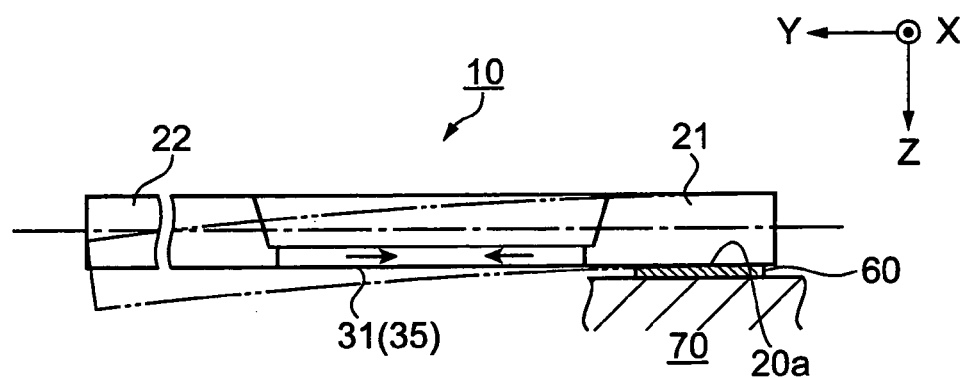
FIG. 5(a) and FIG. 5(b) are an explanation view schematically illustrating the status when the acceleration sensor element according to Embodiment 1 of the present invention is applied with acceleration.
Figure 5B:
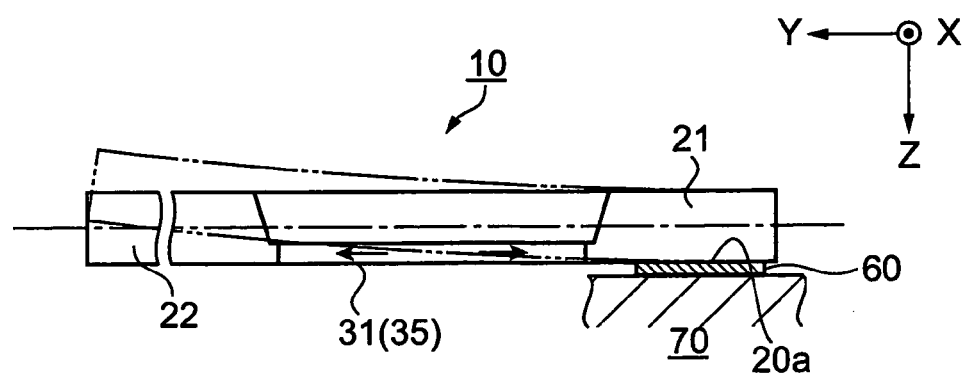

FIGS. 5(a) and 5(b) are an explanation view schematically illustrating when the acceleration sensor element 10 is applied with acceleration. FIG. 5(a) shows the status when acceleration in the −Z axis direction is applied while FIG. 5(b) shows the status when acceleration in the +Z axis direction is applied. In FIGS. 5(a) and 5(b), the acceleration sensor element 10 is fixed to a base 70 with the surface 20a-side faces downward. The surface 20a has the connection terminal sections 46 and 56 and is fixed to a connection electrode (not shown) at which the base 70 is provided by adhesion and connection by electrically conductive adhesive 60. Thus, the acceleration sensor element 10 forms a cantilever arm structure in which the fixed section 21 is provided as a base section.

In FIG. 5(a), when the acceleration sensor element 10 is applied with acceleration in the −Z axis direction, the acceleration sensor element 10 deflects in a cantilever arm-like manner in the +Z axis direction with the fixed section 21 as a base section. Then, the vibration arms 31 and 35 are formed in a range of ⅓ of the thickness from the surface 20a of the acceleration sensor element 10 as described above. Thus, the vibration arms 31 and 35 are compressed in the arrow direction. When being compressed, the vibration arms 31 and 35 have a lower resonance frequency of the bending vibration. Based on a difference between a resonance frequency caused when acceleration is applied and a reference frequency, magnitude of the acceleration can be measured. It is noted that correlation between a difference between a resonance frequency caused when acceleration is applied and a reference frequency and magnitude of the acceleration is calculated in advance to prepare a table so that the magnitude of the acceleration in the +Z axis direction can be measured based on this table.

Furthermore, when being applied with acceleration in the +Z axis direction, the acceleration sensor element 10 deflects in the −Z axis direction and the vibration arms 31 and 35 are extended as shown by the arrow as shown in FIG. 5(*b*). When the vibration arms 31 and 35 are extended, the resonance frequency of the bending vibration is increased. Based on a difference between a resonance frequency caused when acceleration is applied and a reference frequency, magnitude of the acceleration can be measured. As in the case of FIG. 5(*a*), a correlation between a difference between a resonance frequency caused when acceleration is applied and a reference frequency and magnitude of the acceleration is calculated in advance to prepare a table. Thus, magnitude of the acceleration in the −Z axis direction can be measured based on this table.

Thus, according to the above-described acceleration sensor element 10 according to Embodiment 1, when the double-ended vibrating reed 30 consisting of a quartz substrate is applied with acceleration, a change in the resonance frequency of the double-ended vibrating reed 30 is detected based on the deflection of the double-ended vibrating reed 30 (the vibration arms 31 and 35) in the Z axis direction. Thus, the highly-sensitive acceleration sensor element 10 can be realized that responses to the generated deflection to detect acceleration.

Furthermore, the double-ended vibrating reed 30 is known to have a high sensitivity to "stress-frequency change" and a high frequency stability. By using the double-ended vibrating reed as described above, a change in a resonance frequency when acceleration is applied can be accurately detected as acceleration.

Furthermore, the double-ended vibrating reed 30 is formed at a bottom section of the concave section 28 of the quartz substrate 20 (i.e., thin-walled section). Thus, a small size can be realized. Furthermore, the acceleration sensor element 10 has a cantilever arm and includes the weight section 22 at a movable section. Thus, the sensitivity to acceleration in the Z axis direction is increased and an amount of displacement in the Z axis direction can be increased. Thus, detection in a wide range from low acceleration to high acceleration can be realized.

Furthermore, in this embodiment, the double-ended vibrating reed 30 is formed closer to the +Z axis direction side in the thickness direction. Thus, when the deflection in the −Z axis direction is caused, the vibration arms 31 and 35 are extended. Thus, the resonance frequency is increased. When the deflection in the +Z axis direction is caused, the vibration arms 31 and 35 are contracted and thus the resonance frequency is lowered. Thus, an effect is provided in which direction and magnitude of applied acceleration can be detected.

It is noted that, when the double-ended vibrating reed 30 is formed closer to the −Z axis direction side in the thickness direction, a direction along which acceleration is applied and the magnitude also can be detected as in the −Z axis direction.

Furthermore, the double-ended vibrating reed 30 is formed closer to the −Y axis direction side of the acceleration sensor element 10 and the acceleration sensor element 10 has unbalanced mass because the weight section 22 is provided in the +Y axis direction to the center of the Y axis direction. Thus, the weight section 22 can be formed without adding another weight member, thus providing a simpler shape.

Furthermore, in this embodiment, both of top and back main surfaces of the vibration arm 31 in the longitudinal direction have the grooves 31*a*, 31*b*, 31*c*, and 31*d* and both of top and back main surfaces of the vibration arm 35 in the longitudinal direction have the grooves 35*a*, 33*b*, 35*c*, and 35*d* to provide a substantially "H"-like cross section. These grooves are divided at the additional mass section 32 provided at the center of the vibration arms 31 and 35 in the longitudinal direction. Specifically, a weight section is formed at the center of the vibration arm. Thus, a small size can be realized in the same frequency band. By providing the additional mass section 32, an excitation efficiency of a vibration arm can be increased.

Furthermore, the vibration arms 31 and 35 include the excitation the electrodes 41*a*, 42*a*, 41*b*, 42*b*, and 55 as well as 51*a*, 51*b*, 52*a*, 52*b*, and 45 that are divided to three parts in the longitudinal direction of the vibration arms 31 and 35 to cause reverse potentials of neighboring excitation electrodes. In the double-ended vibrating reed 30, an electrode is divided at a point at which a second differential coefficient of a displacement to the long side of the pair of vibration arms 31 and 35 is zero (i.e., point as node of vibration) and reverse potentials are applied to neighboring excitation electrodes so that the directions of displacements of the respective portions of the vibration arm correspond to the driving force. Thus, the excitation efficiency can be improved and a Q value can be improved.

Next, an acceleration sensor including an acceleration sensor element 10 according to Embodiment 1 described above will be described with reference to the drawing.

FIG. 6 is a cross-sectional view illustrating the structure of the acceleration sensor. In FIG. 6, an acceleration sensor 100 is structured so that the acceleration sensor element 10 is stored in a chassis provided by a case consisting of a base 70 and a periphery section 71 and a covering 80.

The base 70 and the periphery section 71 are made of ceramic and are structured by layering them, respectively. An inner surface of the base 70 (upper face in the drawing) has a connection electrode (not shown). This connection electrode extends to outside of the case and is connected to an external connection terminal section 90. Furthermore, this connection electrode is structured so that the connection terminal sections 46 and 56 provided in the acceleration sensor element 10 are electrically connected and fixed by epoxy resin or epoxy resin-base electrically conductive adhesive 60, respectively.

The connection electrode and the connection terminal sections 46 and 56 are provided over the entirety in the ±Y axis direction of the fixed section 21 of the above-described acceleration sensor element 10 and are securely fixed so that the base section of the cantilever arm structure is not inclined when acceleration is applied. After the packaging of the acceleration sensor element 10 in the case as described above, the acceleration sensor element 10 is sealed by the glass-made covering 80. Then, the interior of the chassis is sealed to have a vacuum state.

Thus, the above-described acceleration sensor 100 uses the acceleration sensor element 10 according to Embodiment 1 as described above. Thus, an acceleration sensor can be provided that has a high detection sensitivity, that allows an accurate acceleration to be measured, and that realizes a small size by a simple structure.

Embodiment 2

Next, an acceleration sensor according to Embodiment 2 of the present invention will be described with reference to the drawings. Embodiment 2 is characterized in that an IC as a control circuit to the above-described acceleration sensor (see FIG. 6) is stored in the chassis and a thin structure is provided. Common parts will be denoted with the same reference numerals and will be described.

FIG. 7 is a cross-sectional view illustrating the structure of an acceleration sensor 101 according to Embodiment 2. In FIG. 7, although the acceleration sensor element 10 has the same basic structure as that of Embodiment 1, the connection terminal sections 46 and 56 are provided at the back face 20b of the acceleration sensor element 10.

Thus, the first excitation electrode 40 and the second excitation electrode 50 provided at the vibration arms 31 and 35 are connected to the back face-side connection terminal sections 46 and 56. Furthermore, the acceleration sensor 10 is connected and fixed to the base 70 with the concave section 28 facing to the base 70 side (lower side in the drawing). The structures of the base 70, the periphery section 71, and the covering 80 and a joint structure of the acceleration sensor element 10 and the base 70 are the same as those of Embodiment 1.

Here, the acceleration sensor 101 according to Embodiment 2 includes an IC 110 as a control circuit for excitation control and detection control of the vibration arms 31 and 35. Although the above-described acceleration sensor according to Embodiment 1 also can include the IC 110, this case requires the IC 110 provided between the acceleration sensor element 10 and the base 70. Thus, the thickness must be increased in proportion with the thickness of the IC 110 and wire bonding.

In Embodiment 2, the IC 110 including the range of the wire bonding is provided in a space in the concave section 28 of the acceleration sensor element 10. Even in the case of a structure including the IC 110, an acceleration sensor can have a thinner thickness by doing this.

It is noted that the present invention is not limited to the above-described embodiment. A change or modification for example within a scope in which the objective of the present invention can be achieved is included in the present invention.

Specifically, although the present invention has been particularly illustrated and described mainly with regards to a specific embodiment, the above-described embodiment can be subjected, without departing from the technical concept and the scope of the objective of the present invention, to various modifications by those skilled in the art with regards to the shape, material, combination, other detailed structure, and a processing method between manufacture steps.

Thus, the description limiting the above-disclosed shape, material, and manufacture steps for example has been illustratively provided in order to provide easy understanding of the present invention and does not limit the present invention. Thus, the description of members having names separated from a part or the entirety of the limitation of these shapes, materials, combinations or the like is included in the present invention.

Thus, according to Embodiment 1 and Embodiment 2 described above, an acceleration sensor element that has a detection sensitivity of acceleration and that realizes an accurate acceleration measurement and an acceleration sensor that includes this acceleration sensor element and that uses a simple structure to realize a simple size and a thinner thickness.

The entire disclosure of Japanese Patent Application No. 2005-358565, filed Dec. 13, 2005 is expressly incorporated by reference herein.

The invention claimed is:

1. An acceleration sensor element comprising piezoelectric material, that has a thickness in a Z axis direction, and that is formed at a substrate developed in an orthogonal XY plane, wherein
   when acceleration in the Z axis direction is applied to the substrate while a double-ended vibrating reed in which a pair of vibration arms extend in a Y axis direction of the substrate having bending vibration, the acceleration is detected based on a change in a resonance frequency caused when the double-ended vibrating reed deflects in the Z axis direction,
   both of top and back main surfaces of vibration arms of the double-ended vibrating reed include, in a longitudinal direction of the vibration arms, a groove that has a substantially "H" cross section, and
   the groove is divided at an additional mass section provided at a center in the longitudinal direction of the vibration arms.

2. The acceleration sensor element according to claim 1, wherein
   the double-ended vibrating reed is formed at a thin-walled section of a bottom section of a concave section provided in the substrate;
   a cantilever arm structure includes:
      a fixed section connected with end sections in a −Y axis direction of the pair of vibration arms; and
      a weight section connected with end sections in a +Y axis direction of the pair of vibration arms, and
   when acceleration is applied, the double-ended vibrating reed deflects in the Z axis direction while the fixed section being as a base section.

3. The acceleration sensor element according to claim 1, wherein
   the double-ended vibrating reed is formed closer to a +Z axis direction side or a −Z axis direction side in a thickness direction.

4. The acceleration sensor element according to claim 1, wherein the substrate includes a fixed section side and a weight section side located opposite of the substrate to the fixed section side in the Y axis direction and the double-ended vibrating reed is formed closer to the fixed section side in the Y axis direction of the substrate than the weight section side.

5. The acceleration sensor element according to claim 1, wherein an excitation electrode provided at the double-ended vibrating reed is divided to three parts in a longitudinal direction of the vibration arms to provide reverse potentials of neighboring excitation electrodes.

6. An acceleration sensor, comprising:
   the acceleration sensor element according to claim 1 that is stored in a chassis consisting of a case and a covering; and
   a fixed section of an end section in a −Y axis direction of the acceleration sensor element is fixed to an inner face of the case.

7. The acceleration sensor element according to claim 6, further comprising
   a control circuit that controls excitation of the double-ended vibrating reed and is located in the chassis, and
   the control circuit is provided in a space of a concave section in which the double-ended vibrating reed is formed.

* * * * *